(12) United States Patent
Maehara

(10) Patent No.: US 7,555,963 B2
(45) Date of Patent: Jul. 7, 2009

(54) TORQUE SENSOR

(75) Inventor: Hideo Maehara, Kani (JP)

(73) Assignee: Kayaba Industry Co., Ltd., Tokyo (JP)

( * ) Notice: Subject to any disclaimer, the term of this patent is extended or adjusted under 35 U.S.C. 154(b) by 0 days.

(21) Appl. No.: 11/737,719

(22) Filed: Apr. 19, 2007

(65) Prior Publication Data

US 2008/0092671 A1 Apr. 24, 2008

(30) Foreign Application Priority Data

Apr. 24, 2006 (JP) ............................... 2006-119321

(51) Int. Cl.
*G01L 3/00* (2006.01)
(52) U.S. Cl. .............................. 73/862.333; 73/862.331
(58) Field of Classification Search ................................. 73/862.331–862.334
See application file for complete search history.

(56) References Cited

U.S. PATENT DOCUMENTS

2005/0150312 A1* 7/2005 Nakatani et al. ....... 73/862.331
2005/0247138 A1* 11/2005 Nakane et al. ......... 73/862.331
2006/0021451 A1* 2/2006 Ishihara et al. ......... 73/862.331
2007/0295109 A1* 12/2007 Tokumoto et al. ....... 73/862.331

FOREIGN PATENT DOCUMENTS

JP          3094049 B     10/2000

\* cited by examiner

*Primary Examiner*—Lisa M Caputo
*Assistant Examiner*—Jonathan Dunlap
(74) *Attorney, Agent, or Firm*—Hiroe & Associates; Michael L. Crapenhoft

(57) ABSTRACT

A torque sensor is provided in which a magnetic body can be easily positioned and fixed, and in which an excessive force is prevented from being exerted on a resin or the magnetic body when the magnetic body is press-fitted to a shaft, whereby no resin is damaged, and further stress is not left at the magnetic body. The torque sensor is characterized in that a press-fit member to be press-fitted to a shaft is molded with a resin in a state in which a part thereof is exposed to the outside of the resin, whereby the part thereof becomes a pressure receiving portion, and the pressure receiving portion is pressed with an assembly jig when a magnetic yoke assembly is incorporated to a shaft.

4 Claims, 14 Drawing Sheets

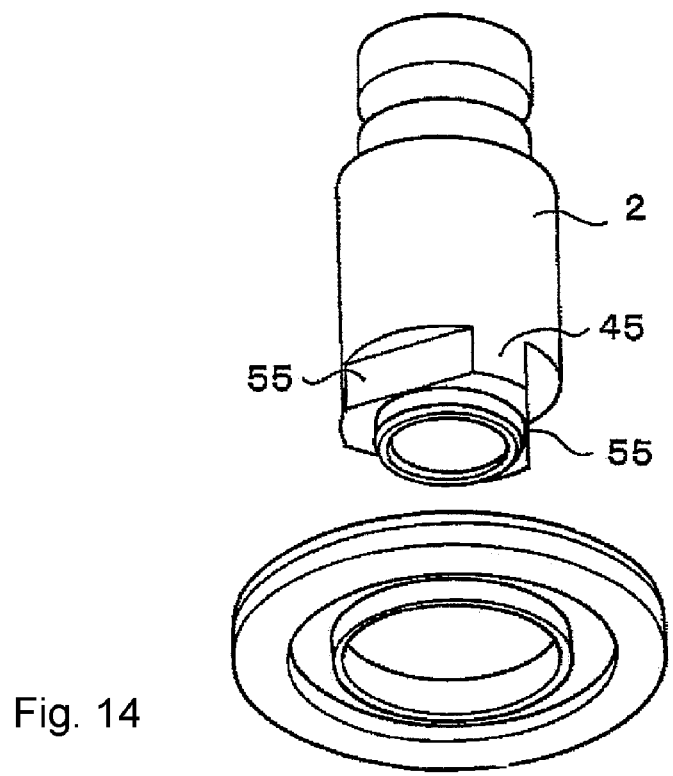
Fig. 14
Fig. 15
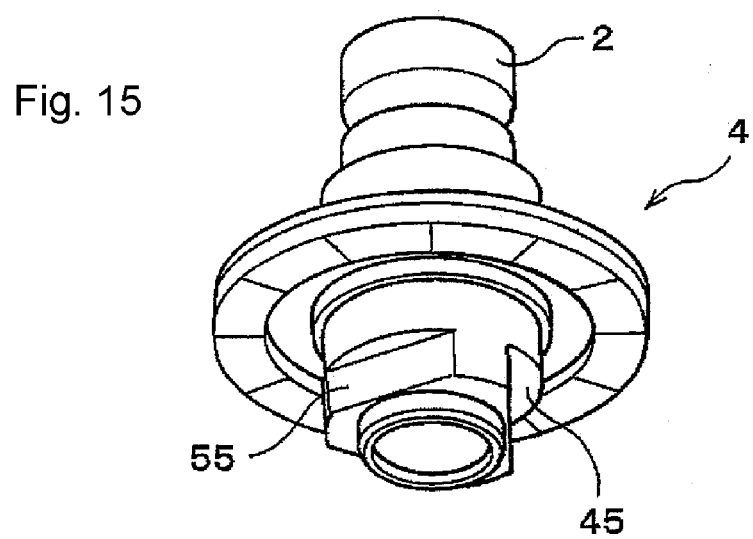

TORQUE SENSOR

BACKGROUND OF THE INVENTION

The present invention relates to a torque sensor suitable for use in a power steering device.

FIGS. 21 to 24 show a construction of a torque sensor 100 of a conventional art (shown in Japanese Patent No. 3094049, for example). FIG. 21 is a perspective view in the vicinity of the torque sensor. FIG. 22 is a partially enlarged view of FIG. 9 of the Japanese patent document. FIGS. 23 and 24 are diagrams for explaining the action.

In FIG. 21, the torque sensor 100 is provided between a first shaft 101 and a second shaft 102. At the first shaft 101, a magnetism generation portion 103 for outputting a magnetic flux is provided. The magnetism generation portion 103 has a plurality of magnets 104 provided in the circumferential direction around the first shaft 101. The magnets 104 are magnetized toward the axis core direction (arrow direction) of the first shaft 101 and the adjoining magnets 104 are magnetized in the directions opposite to each other, and thus, when the magnetism generation portion 103 is seen from the second shaft 102 side, as shown in FIG. 10 of the Japanese patent document, magnetic poles different from each other are adjoined. That is, S poles and N poles are arranged alternately.

As shown in FIG. 21, the second shaft 102 is provided with an outer ring 105 and an inner ring 106, and as shown in FIG. 22, a plurality of outer magnetic path pieces 107 are extended from the outer ring 105, while inner magnetic path pieces 108 are extended from the inner ring 106. As shown in FIG. 22, a clearance 109 is provided between the outer ring 105 and the inner ring 106, and a magnetic sensor 110 is arranged in the clearance 109.

Next, action will be described. Suppose that a driver does not steer a steering wheel. In the case, since the first shaft 101 is not rotated with respect to the second shaft 102, as shown in FIG. 23, each outer magnetic path piece 107 is opposed to the N pole and the S pole of the magnet 104 over the same area each, and each inner magnetic path piece 108 is similarly opposed to the N pole and the S pole of the magnet 104 over the same area each. In this case, the magnetic flux is not guided to the outer magnetic path piece 107 and the inner magnetic path piece 108, and the magnetic flux outputted from the N pole of the magnet 104 is inputted to the S pole of the magnet 104. Therefore, the magnetic flux sensor 110 does not detect the magnetic flux.

Next, suppose that the driver has steered the steering wheel. In this case, the first shaft 101 is rotated with respect to the second shaft 102, and as shown in FIG. 24, for example, the outer magnetic path piece 107 is moved to the S pole side, while the inner magnetic path piece 108 is moved to the N pole side. In this case, since the magnetic flux outputted from the N pole of the magnet 104 reaches the S pole of the magnet 104 via the inner magnetic path piece 108, the inner ring 106, the magnetic sensor 110, the outer ring 105, and the outer magnetic path piece 107, a rotation amount of the first shaft 101 with respect to the second shaft 102, that is, a steering torque of the steering wheel can be detected based on the magnetic flux amount detected by the magnetic sensor 110.

SUMMARY OF THE INVENTION

In the above-described Japanese patent document, however, the method of mounting the outer ring 105 and the inner ring 106 to the second shaft 102 is not described. Assuming that the outer ring 105 and the inner ring 106 are mounted onto the second shaft 102 by press fitting, the following problems arise.

Since the outer ring 105 and the inner ring 106 are made of a magnetic body, in the case where stress generated when these outer ring 105 and inner ring 106 are mounted onto the second shaft 102 remains at these outer ring 105 and inner ring 106, due to reduction of a magnetic permeability or augmentation of retentiveness, there is a fear that outputs from a sensor acting as a magnetic sensor are decreased or hysteresis is increased.

Furthermore, in the case where the outer ring 105 and the inner ring 106 are molded with a resin, there is a fear of inducing cracks of the resin when the outer ring 105 and the inner ring 106 are press-fitted to the second shaft 102.

In addition, in the above-described Japanese patent document, the method of positioning of the outer ring 105 and the inner ring 106 is not described at all.

The present invention was made in view of such problems of the background art and has an object to provide a torque sensor in which a magnetic body can be easily positioned and fixed, as well as an excessive force is prevented from exerting on a resin or a magnetic body when the magnetic body is press-fitted to a shaft, whereby no resin is damaged, and further stress is not left at the magnetic body to the utmost.

A torque sensor according to the present invention is a torque sensor comprising a housing in which a magnetic yoke portion formed of a first magnetic yoke and a second magnetic yoke for guiding a magnetic flux in the axis core direction generated from a magnetism generation portion mounted around a first shaft, is provided in the circumferential direction of a second shaft, the first shaft and the second shaft accommodated in the housing and connected coaxially by a torsion bar, and the magnetism generation portion mounted onto the first shaft so as to surround the outer circumference of the first shaft and outputting a magnetic flux in the axis core direction of the first shaft, in which:

a plurality of magnetic yoke portions comprising the first magnetic yoke and the second magnetic yoke for guiding the magnetic flux outputted from the magnetism generation portion are mounted onto the second shaft; and a torque between the first shaft and the second shaft is detected magnetically by a magnetic sensor through detection of the magnetic flux in a magnetic gap between the first magnetic yoke and the second magnetic yoke, wherein an annular press-fit member and the magnetic yoke portion to be press-fitted to the second shaft are molded with a resin to form an annular magnetic yoke assembly having an insertion hole at the central portion; as well as the press-fit member is molded with the resin in a state in which a part thereof is exposed to the outside of the resin, whereby the part thereof becomes a pressure receiving portion; and the pressure receiving portion is pressed with an assembly jig when the magnetic yoke assembly is incorporated to the second shaft.

According to the present invention, a part of a press-fit member comes to be a pressure receiving portion to be exposed to the outside of a resin. Therefore, by pressing the pressure receiving portion to press-fit the press-fit member onto the second shaft, a torque sensor is mounted onto the second shaft. At that time, not only the first magnetic yoke and the second magnetic yoke are not directly affected by forces upon press-fitting, and thus less likely to be damaged, but also since little force remains as a stress, the decrease of sensor outputs or the increase of hysteresis can be suppressed. In addition, since no excessive force is exerted on the resin, the resin is less likely to be damaged.

BRIEF DESCRIPTION OF THE DRAWINGS

FIG. 14 is a perspective view in a state of on the way of a non-magnetized magnetic body being incorporated to the input shaft.

FIG. 15 is a perspective view in a state in which a magnetism generation portion is provided at the input shaft.

DETAILED DESCRIPTION OF PREFERRED EMBODIMENTS

Figure 1:
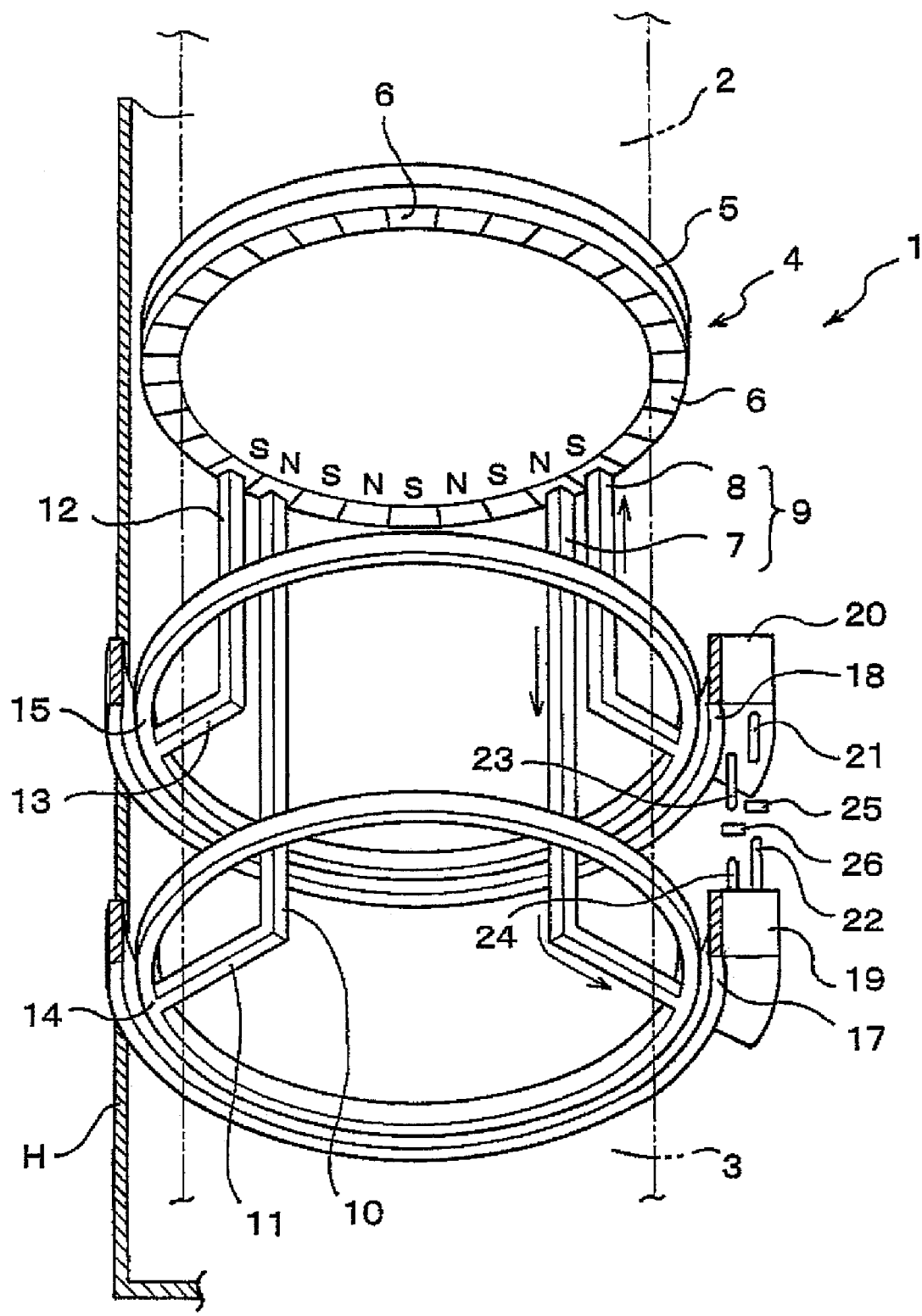
FIG. 1 is a view showing the principle of a torque sensor.
Figure 2:
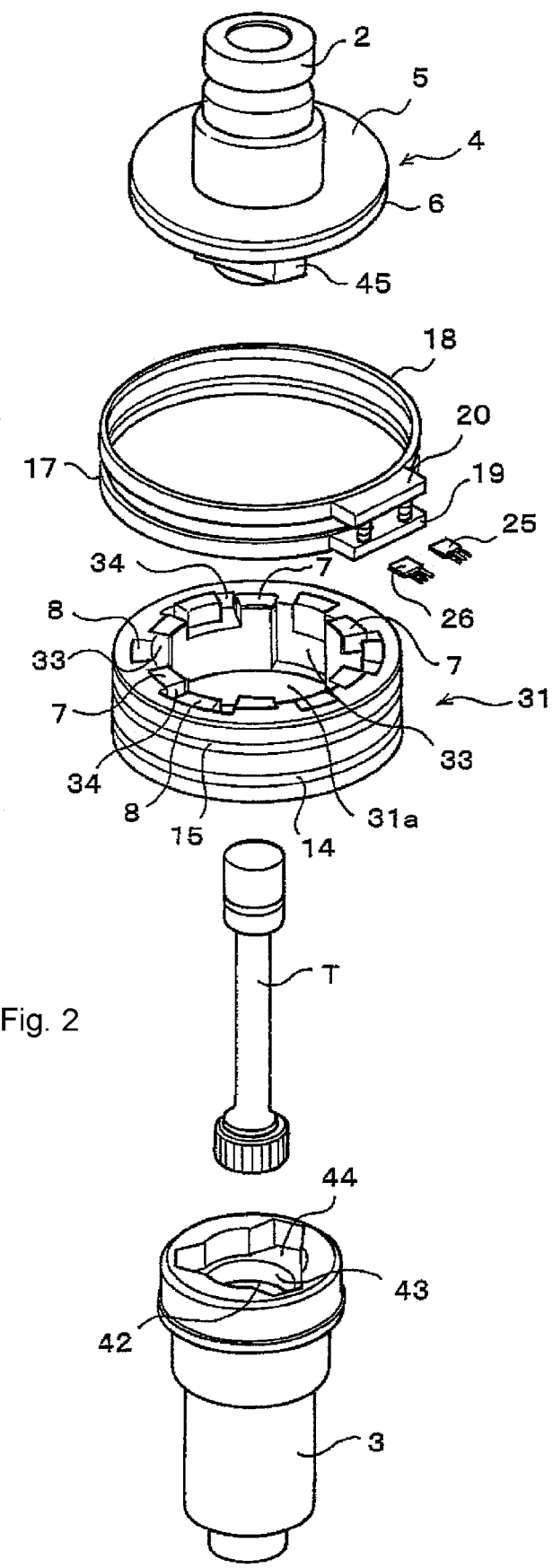
FIG. 2 is an exploded perspective view of the torque sensor.

FIG. 1 shows a principle of a torque sensor according to an embodiment of the present invention. FIG. 2 shows an exploded perspective view of the torque sensor according to the embodiment. FIGS. 1 and 2 explain an example used when a torque sensor 1 of the present invention is applied to an electric power steering device to detect a torque between an input shaft 2 and an output shaft 3. The input shaft 2 and the output shaft 3 are stored in a housing H. In the case, a first shaft corresponds to an input shaft and a second shaft corresponds to an output shaft.

To the input shaft 2, a steering torque is given by the steering wheel. The output shaft 3 gives a steering assisting force to the steered system side. The input shaft 2 and the output shaft 3 are connected to each other by a torsion bar T (shown in FIG. 2).

At the input shaft 2, a magnetism generation portion 4 is provided. The magnetism generation portion 4 is in the structure that an annular magnet portion 6 is provided at a back yoke 5 formed of an annular magnetic body. The magnet portion 6 is magnetized toward the axis core direction of the input shaft 2 and in the circumferential direction of the input shaft 2, magnetized so that N poles and S poles are arranged alternately.

At the output shaft 3, a magnetic yoke portion 9 constructed of a first magnetic yoke 7 and a second magnetic yoke 8 is provided. The magnetic yoke portion 9 is provided on the outer circumference of the output shaft 3 in plural toward the circumferential direction. The first magnetic yoke 7 is formed of a straight portion 10 and a crossing portion 11 orthogonal to the straight portion 10 and bent in the L shape. The straight portion 10 of the first magnetic yoke 7 is provided along the axial direction, and one end of the first magnetic yoke 7 is faced to the magnet portion 6. Also, the crossing portion 11 of the first magnetic yoke 7 is provided in the radial direction, and the other end of the first magnetic yoke 7 is faced outward in the radial direction of the output shaft 3.

Also, the second magnetic yoke 8 is formed of a straight portion 12 and a crossing portion 13 orthogonal to the straight portion 12 and bent in the L shape. The straight portion 12 of the second magnetic yoke 8 is provided along the axial direction, and one end of the second magnetic yoke 8 is faced to the magnet portion 6. Also, the crossing portion 13 of the second magnetic yoke 8 is provided in the radial direction, and the other end of the second magnetic yoke 7 is faced outward in the radial direction of the output shaft. The other end of the first magnetic yoke 7 and the other end of the second magnetic yoke 8 are separated from each other in the axis core direction of the output shaft 3.

The other ends of the first magnetic yoke 7 of each magnetic yoke portion 9 are connected to each other by a first magnetic ring 14, while the other ends of the second magnetic yoke 8 of each magnetic yoke portion 9 are connected to each other by a second magnetic ring 15.

In FIG. 2, the first magnetic yoke 7, the second magnetic yoke 8, the first magnetic ring 14, and the second magnetic ring 15 are formed as a unit of a magnetic yoke assembly 31 in the state of being molded with a resin S.

Furthermore, opposed to the first magnetic ring 14, a first magnetism collecting ring 17 is provided at a housing H. The first magnetism collecting ring 17 is formed in the shape that a plate material is bent in an annular state. The first magnetism collecting ring 17 is mounted onto the inner surface of the housing H by means such as fitting. The width in the axis core direction of the first magnetism collecting ring 17 is formed to be larger than the width in the axis core direction of the first magnetic ring 14.

Also, opposed to the second magnetic ring 15, a second magnetism collecting ring 18 is provided at the housing H. The second magnetism collecting ring 18 is formed in the shape that a plate material is bent in the annular state. The second magnetism collecting ring 18 is mounted onto the inner surface of the housing H by means such as fitting. The width in the axis core direction of the second magnetism collecting ring 18 is formed to be larger than the width in the axis core direction of the second magnetic ring 15.

A first magnetism collecting yoke 19 is provided at the first magnetism collecting ring 17, while a second magnetism collecting yoke 20 is provided at the second magnetism collecting ring 18. At the first magnetism collecting yoke 19 and the second magnetism collecting yoke 20, two pairs of projections 21, 22, 23, 24 are provided so that they are opposed to each other. A magnetic gap is formed between each pair of projections 21, 22, 23, 24, and magnetic sensors 25, 26 are arranged in the magnetic gaps.

Figure 3:
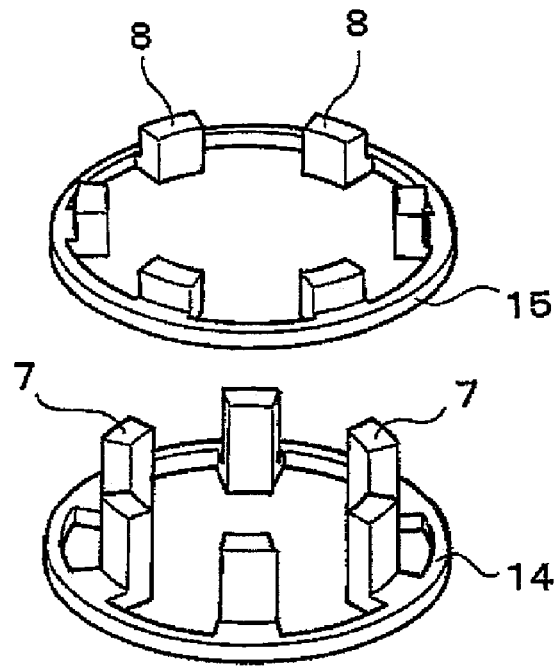
FIG. 3 is an exploded perspective view of a first magnetic yoke, a first magnetic ring, a second magnetic yoke, a second magnetic ring and a sleeve.
Figure 4:
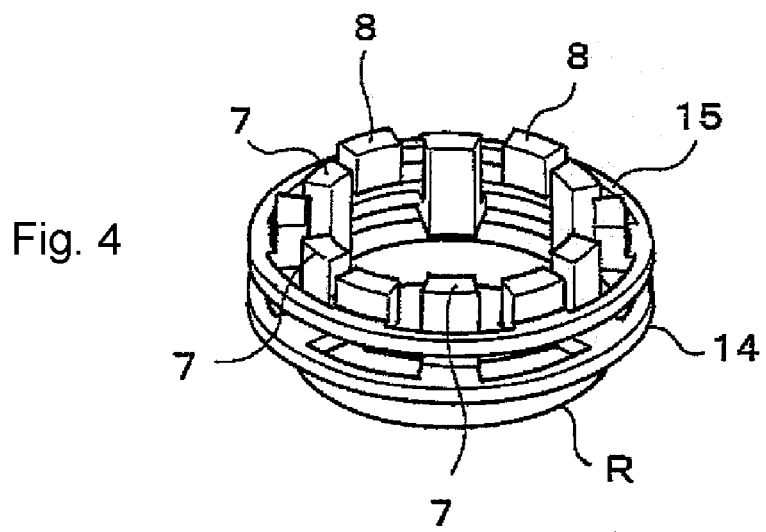
FIG. 4 is a perspective view in a state in which the first magnetic yoke, the first magnetic ring, the second magnetic yoke, the second magnetic ring and the sleeve are assembled.
Figure 5:
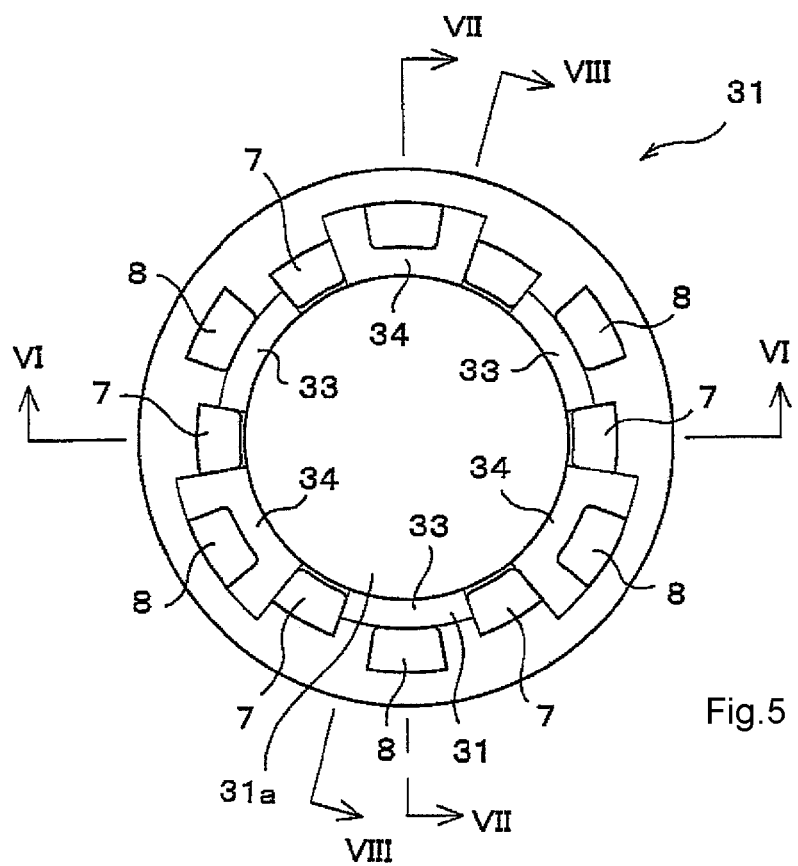
FIG. 5 is a plan view of a magnetic yoke assembly.
Figure 6:
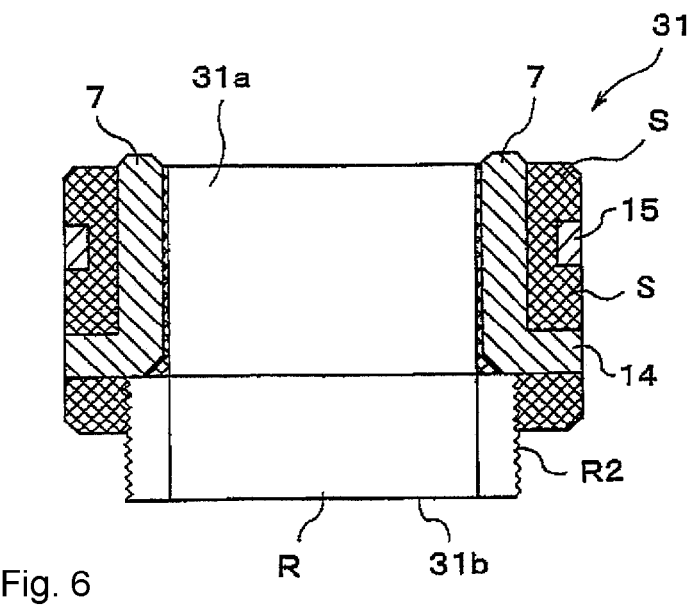
FIG. 6 is a VI-VI sectional view of FIG. 5.
Figure 7:
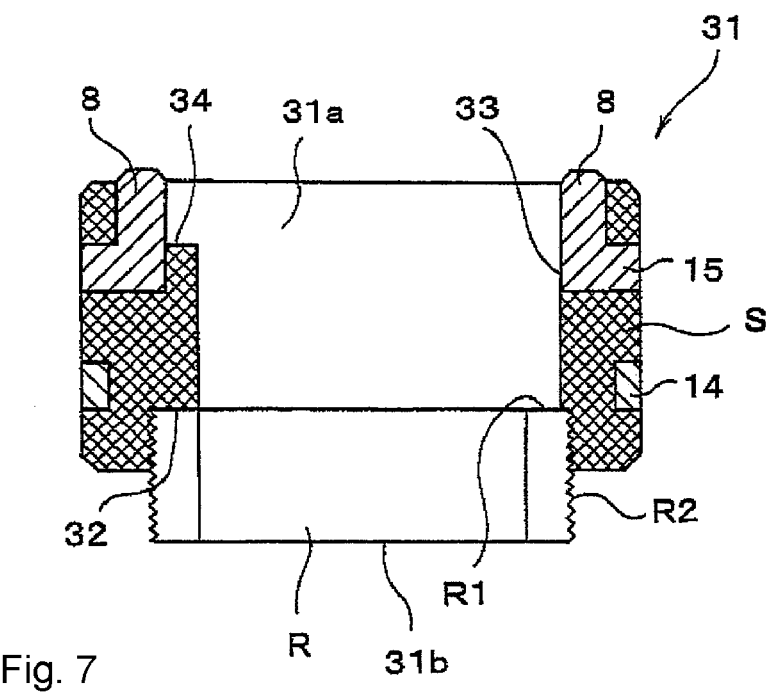
FIG. 7 is a VII-VII sectional view of FIG. 5
Figure 8:
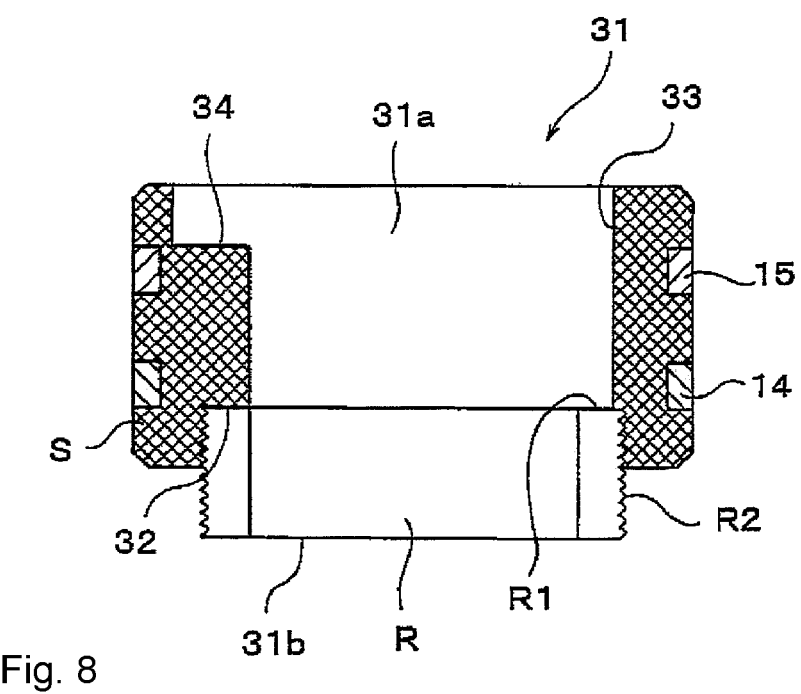
FIG. 8 is a VIII-VIII sectional view of FIG. 5.

FIG. 3 is an exploded perspective view of the magnetic yoke assembly 31. FIG. 4 shows a perspective view of an arrangement state before components of the magnetic yoke assembly 31 are molded with the resin S. FIG. 5 shows top end view. FIG. 6 shows a VI-VI sectional view of FIG. 5. FIG. 7 shows a VII-VII sectional view of FIG. 5. FIG. 8 shows a VIII-VIII sectional view of FIG. 5.

In the case of forming the magnetic yoke assembly 31, as shown in FIG. 3, the first magnetic yoke 7 and the first magnetic ring 14 are positioned below the second magnetic yoke 8 and the second magnetic ring 15, and further a sleeve R is positioned below the first magnetic yoke 7 and the first magnetic ring 14. The sleeve R corresponds to an annular press-fit member.

Next, as shown in FIG. 4, the first magnetic yoke 7 is inserted into the second magnetic ring 15.

Subsequently, using a resin die, the first magnetic yoke 7 and the first magnetic ring 14, the second magnetic yoke 8 and the second magnetic ring 15, and the sleeve R are molded with the resin S in the arrangement state as shown in FIG. 4, whereby a magnetic yoke assembly 31 as shown in FIG. 2 has been completed.

Like this, since only in conformity with the shape of a resin die, the first magnetic yoke 7, the second magnetic yoke 8, the first magnetic ring 14, the second magnetic ring 15 and the sleeve R can be molded into one piece by resin molding while being positioned in place, no additional part such as spacer for positioning is required.

As shown in FIG. 2 and FIGS. 6 through 8, the magnetic yoke assembly 31 is in an annular shape having an insertion hole 31a at the central portion. The magnetic yoke assembly 31 has a press-fit opening 31b on the lower end side. Moreover, as shown in the same FIGS. 6 through 8, the outer circumferential portion of the press-fit opening 31b of the sleeve R is exposed to the outside of the resin S, thereby being a resin crack-preventing portion R2. Furthermore, as shown in the same FIGS. 7 and 8, the upper end of the sleeve R is in contact with a shoulder 32 of the resin S.

As shown in FIG. 5, in the case of viewed from the top end side of the magnetic yoke assembly 31, the second magnetic yoke 8 is positioned outside in the radial direction of the first magnetic yoke 7, as well as the first magnetic yokes 7 and the second magnetic yokes 8 are positioned alternately in the circumferential direction.

Moreover, as shown in FIGS. 2 and 5, a notch 33 and concave 34 are alternately provided in the circumferential direction between the first magnetic yokes 7. As shown in FIG. 5, three notches 33 and three concaves 34 are formed alternately in the circumferential direction respectively.

The notches 33 are portions formed by the inner circumference of the insertion hole 31a of the magnetic yoke assembly 31a being partially notched. As shown in FIGS. 7 and 8, by provision of the notches 33, a part of the upper end of the sleeve R is exposed, and incorporated as a pressure receiving portion R1. In addition, as shown in FIGS. 2 and 5, with the concaves 34 and the notches 33, the top of each first magnetic yoke 7 is exposed.

The magnetic yoke assembly 31 is press-fitted and incorporated to the output shaft 3 by being pressed from above with an assembly jig (described later) to be inserted into the insertion hole 31a of the magnetic yoke assembly 31.

Now, the shape of the assembly jig 41 for incorporating the magnetic yoke assembly 31 with the output shaft 3 is described. Since the assembly jig 41 is formed in shape in conformity with the shape of the magnetic yoke assembly 31 and the output shaft 3, the shape of the output shaft 3 is described before the shape of the assembly jig 41 is described.

Figure 9:
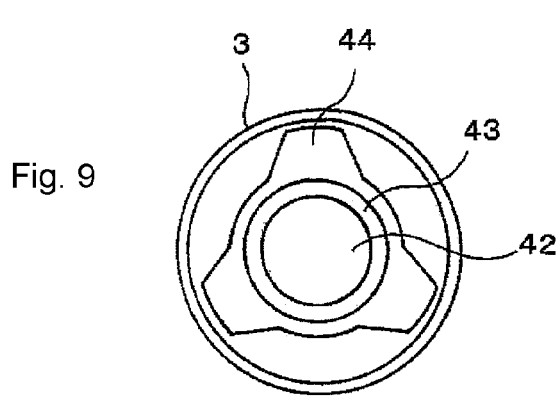
FIG. 9 is a top view of an output shaft.

As shown in FIG. 2, the output shaft 3 is formed in a rod shape, and as shown in FIGS. 2 and 9, formed with a small-diameter hole 42, a medium-diameter hole 43, and a stopper receiving portion 44 at the top. As shown in FIG. 2, the small-diameter hole 42 is a hole into which the lower end portion of a torsion bar T is inserted to connect thereto with serrations. The torsion bar T is inserted through the input shaft 2 and connected to the input shaft 2 with a pin at the top portion thereof. The stopper receiving portion 44 is formed in a concave shape.

As shown in FIG. 9, when the stopper receiving portion 44 is viewed from the top in the axial direction of the output shaft 3, the stopper receiving portion 44 is formed in a substantially triangular rice-ball shape, apexes of which are formed to be arc-shaped. Whereby, a stopper portion 45 of the input shaft 2 (shown in FIGS. 2 and 10) is fitted to the stopper receiving portion 44.

The stopper portion 45 of the input shaft 2 is formed to be rather small than the stopper receiving portion 44, as shown in FIG. 2, to be fitted in the stopper receiving portion 44, thereby regulating the relative angle between the input shaft 2 and the output shaft 3 at a predetermined angle.

Figure 11:
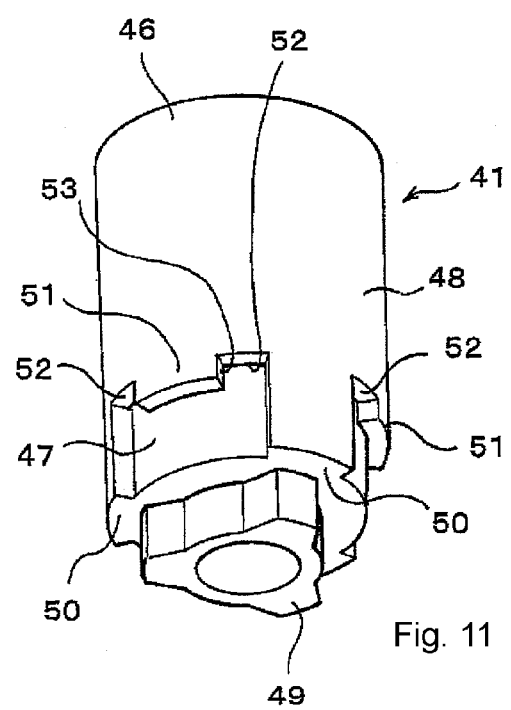
FIG. 11 is a perspective view of an assembly jig.
Figure 12:
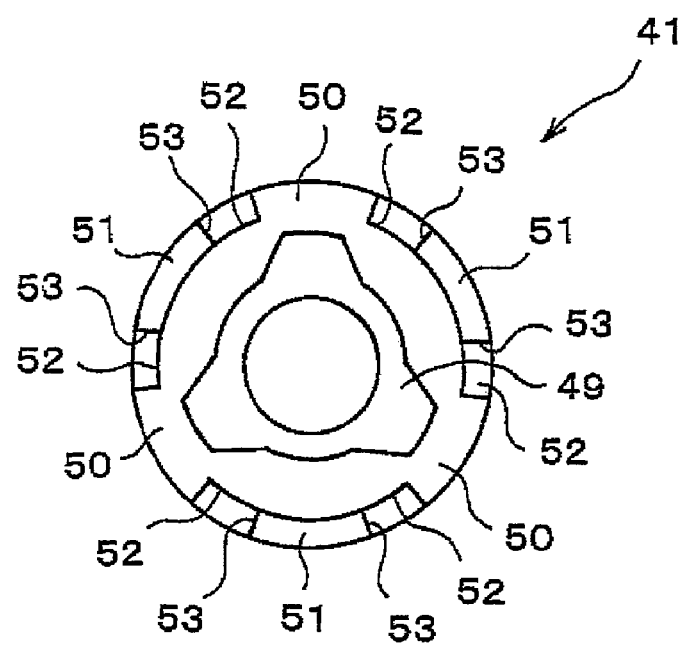
FIG. 12 is a bottom view of the assembly jig.
Figure 13:
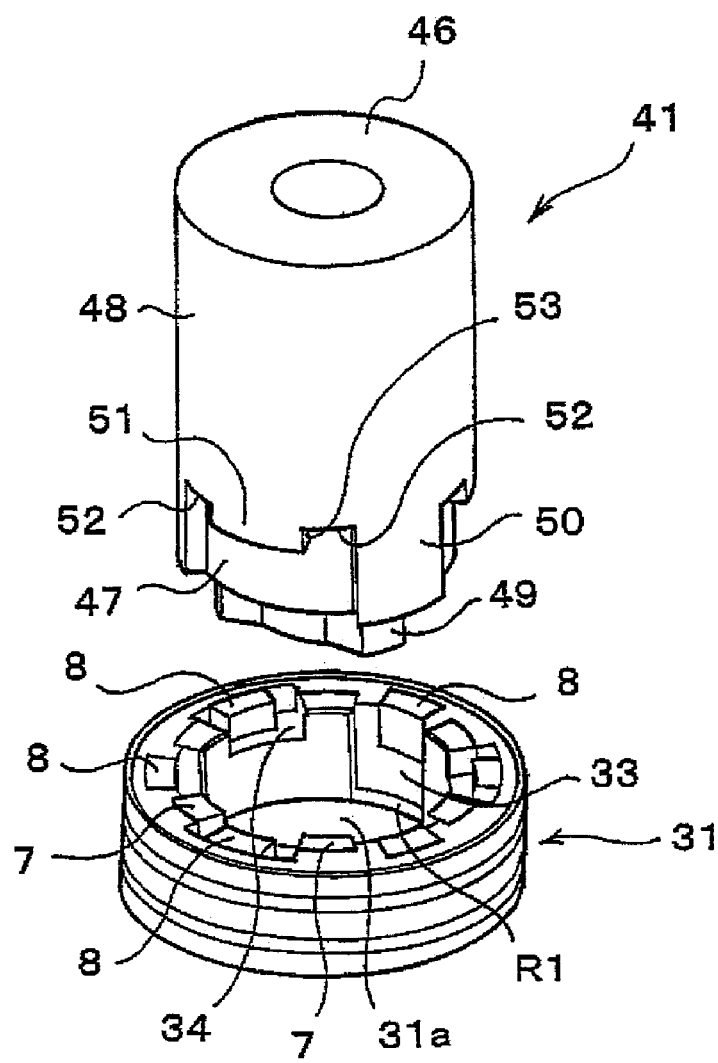
FIG. 13 is a perspective view in a state of on the way of the magnetic yoke assembly being incorporated to the output shaft using the assembly jig.
Figure 13:
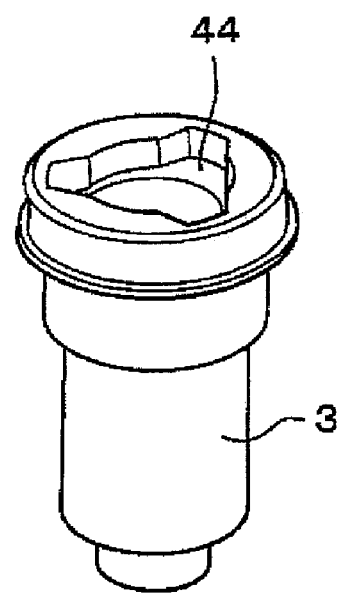

As shown in FIG. 11, the assembly jig 41 includes a tubular jig body 46 to be inserted into the magnetic yoke assembly 31. The jig body 46 has a smaller-diameter portion 47 at the lower portion, and a larger-diameter portion 48 at the upper portion. The smaller-diameter portion 47 is inserted into the insertion hole 31a of the magnetic yoke assembly 31. On the underside of the smaller-diameter portion 47, an output shaft positioning portion 49 is formed so as to protrude downward. As shown in FIG. 12, when the assembly jig 41 is viewed from the underside in the axis core direction, the output shaft positioning portion 49 is formed in a substantially rice-ball shape, apexes of which are formed to be arc-shaped. Whereby, as shown in FIG. 13, the assembly jig 41 is shaped such that when the magnetic yoke assembly 31 is press-fitted to the output shaft 3, the smaller-diameter portion 47 of the jig body 46 is inserted in the insertion hole 31a of the magnetic yoke assembly 31 from above, and thus the output shaft positioning portion 49 can be fitted to the stopper receiving portion 44 of the output shaft 3. By the output shaft positioning portion 49 being fitted to the stopper receiving portion 44 of the output shaft 3, positioning in the circumferential direction of the assembly jig 41 with respect to the output shaft 3 is made.

The assembly jig 41 is formed with a pressing portion 50 and a fit pushing portion 51 by the smaller-diameter portion 47 being expanded in diameter. The pressing portion 50 is a portion to be in contact with the pressure receiving portion R1 of the magnetic yoke assembly 31 when the smaller-diameter portion 47 of the assembly jig 41 is inserted into the insertion hole 31a of the magnetic yoke assembly 31. Furthermore, the fit pushing portion 51 is a portion to be fitted to the concave 34 of the magnetic yoke assembly 31 when the smaller-diameter portion 47 of the assembly jig 41 is inserted in the insertion hole 31a of the magnetic yoke assembly 31. When the smaller-diameter portion 47 of the assembly jig 41 is inserted in the insertion hole 31a of the magnetic yoke assembly 31, the portion between these pressing portion 50 and fit pushing portion 51 comes to an escape concave 52, and then the escape concave 52 is fitted to the top of the first magnetic yoke 7; as well as the sides of the fit pushing portion 51 act as a positioning face 53. Due to that the positioning faces 53 are contacted to the upper portion of the first magnetic yoke 7, positioning between the assembly jig 41 and the magnetic yoke assembly 31 is made.

Then, in the case where the magnetic yoke assembly 31 is incorporated to the output shaft 3, first, from the state shown in FIG. 13, the press-fit opening 31b of the sleeve R is put on the output shaft 3. Thereafter, the assembly jig 41 is inserted into the insertion hole 31a of the magnetic yoke assembly 31 from above. At that time, the fit pushing portion 51 of the assembly jig 41 is fitted to the concave 34 of the magnetic yoke assembly 31, the escape concave 52 is fitted to the top of the first magnetic yoke 7, and the positioning face 53 is contacted with the sides of the upper portion of the first magnetic yoke 7, whereby positioning between the assembly jig 41 and the magnetic yoke assembly 31 is made. Furthermore, the pressing portion 50 of the assembly jig 41 is in contact with the pressure receiving portion R1 of the magnetic yoke assembly 31.

Then, from this state, the assembly jig 41 is pressed downward while being rotated in the circumferential direction, and thus the output shaft positioning portion 49 of the assembly jig 41 is made to fit to the stopper receiving portion 44 of the output shaft 3. Thereafter, the assembly jig 41 is pressed downward strongly, and the pressure receiving portion R1 of the magnetic yoke assembly 31 is pressed downward with the pressing portion 50 of the assembly jig 41, whereby the sleeve R of the magnetic yoke assembly 31 is press-fitted to the output shaft 3. Thus, the magnetic yoke assembly 31 is to be incorporated to a suitable position in the circumferential direction of the output shaft 3.

Figure 10:
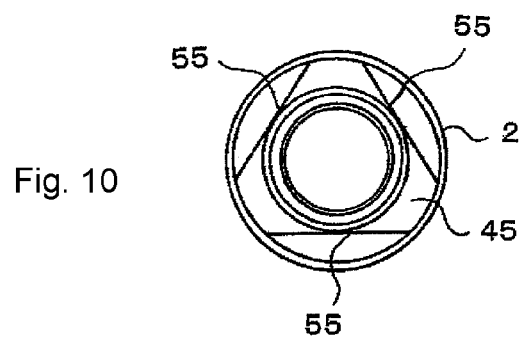
FIG. 10 is a bottom view of an input shaft.
Figure 16:
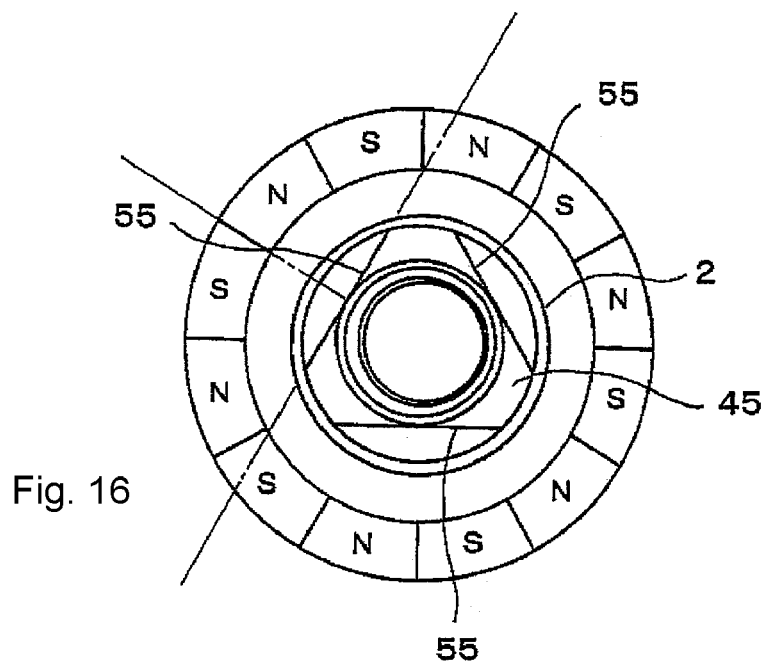
FIG. 16 is a bottom view of the input shaft in a state in which the magnetism generation portion is provided at the input shaft.

Furthermore, as shown in FIGS. 2 and 10, due to that the stopper portion 45 provided on the underside of the input shaft 2 is formed in such a characteristic shape as a substantially triangular rice-ball shape, a stopper surface 55 of the stopper portion 45 can be a reference when a magnetism generation portion 4 is magnetized. That is, as shown in FIG. 14, a ring-like magnetic body not having been magnetized is mounted onto the input shaft 2, and thereafter, as shown in FIG. 15, the magnetic body is magnetized, thereby enabling to form the magnetism generation portion 4. On that occasion, for example, as shown with alternate long and short dashed lines in FIG. 16, the magnetism generation portion 4 is so magnetized that the boundary line between the S pole and the N pole is positioned on the extension line of the stopper surface 55 of the stopper portion 45, or the magnetism generation portion 4 is so magnetized that the boundary line between the S pole and the N pole is positioned on the bisector of the stopper surface 55. Thus, the circumferential position of the magnetism generation portion 4 can be determined with letting the stopper surface 55 to be a reference.

Figure 17:
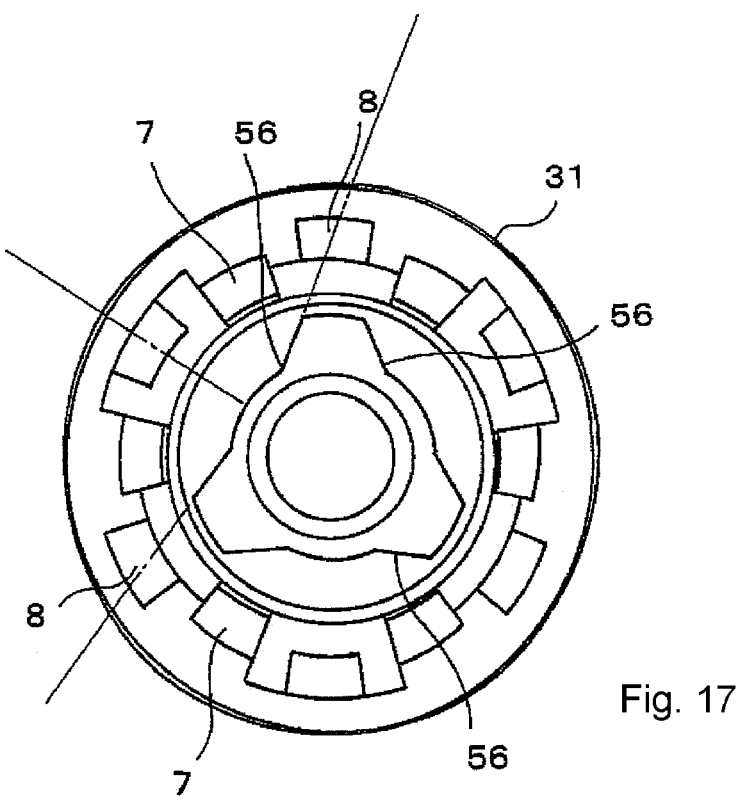
FIG. 17 is a view taken from above in a state in which the magnetic yoke assembly is incorporated to the output shaft.

On the other hand, as shown in FIGS. 2 and 9, due to that the stopper receiving portion 44 provided at the output shaft 3 is formed in such a characteristic shape as a substantially triangular rice-ball shape, a stopper receiving surface 56 of the stopper receiving portion 44 can be a reference of positioning of the magnetic yoke assembly 31. That is, for example, as shown with alternate long and short dashed lines in FIG. 17, the magnetic yoke assembly 31 is so positioned that the second magnetic yoke 8 is positioned on the extension of the stopper receiving surface 56, or the magnetic yoke assembly 31 can be so positioned that the second magnetic yoke 8 is positioned on the bisector of the stopper receiving surface 56.

Incidentally, as described above, a part of the end of the sleeve R is extended inward in the radial direction of the insertion hole 31a of the magnetic yoke assembly 31 to be the pressure receiving portion R1. Further, by pressing the pressure receiving portion R1 with the assembly jig 41, the magnetic yoke assembly 31 is mounted onto the output shaft 3. Thus, forces generated upon press fitting are hardly exerted on a resin S, the first magnetic yoke 7, the second magnetic yoke 8, the first magnetic ring 14, and the second magnetic ring 15. Therefore, the forces upon press fitting are hardly left as stresses at the first magnetic yoke 7, the second magnetic yoke 8, the first magnetic ring 14, and the second magnetic ring 15. Due to reduction of a magnetic permeability or augmentation of retentiveness, not only the decrease of outputs from a sensor acting as a magnetic sensor or the increase of hysteresis is less likely to occur, but also a resin S is less likely to be damaged.

Furthermore, as shown in FIGS. 6 through 8, the lower end side of the sleeve R, that is the outer circumference on the press-fitted side acts as a resin crack preventing portion R2 to be provided with no resin S. Therefore, when the sleeve R is press-fitted to the output shaft 3, even if the sleeve R is expanded in diameter, the resin S is less likely to be damaged, and further a diameter expansion force at the sleeve R is less likely to remain at the resin S as stress.

Next, action of detecting steering torques with the torque sensor 1 will be described. In the state where the steering wheel is not steered, as shown in FIG. 18, the centers of each one end of the first magnetic yoke 7 and the second magnetic yoke 8 are located at the boundary between the N pole and the S pole with each one end extending over the N pole and the S pole of the magnet portion 6 so that each one end is faced to the N pole and the S pole by the same area.

Figure 18:
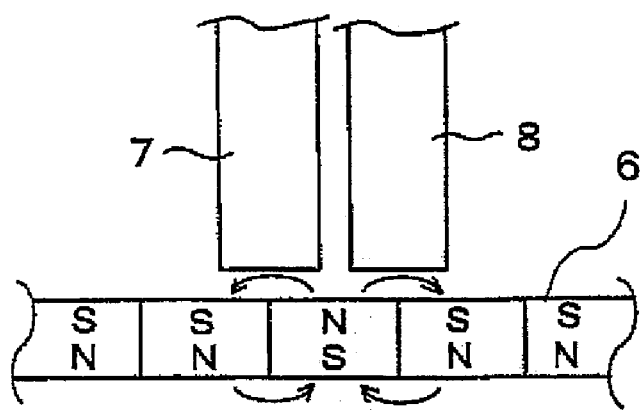
FIG. 18 is a diagram for explaining action.

As shown in FIG. 18, in this state, the magnetic flux outputted from the N pole is not guided by the first magnetic yoke 7 and the second magnetic yoke 8 but inputted to the S pole of the magnet portion 6. Therefore, the magnetic sensors 25, 26 shown in FIGS. 1 and 2 do not detect the magnetic flux.

Figure 19:
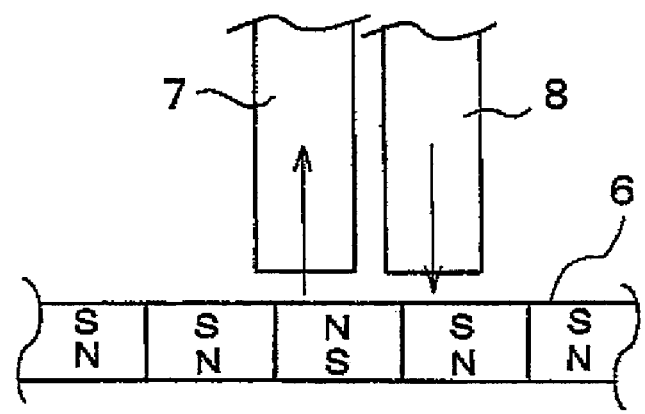
FIG. 19 is a diagram for explaining action.

Next, suppose that the driver steers the steering wheel. In this case, since the input shaft 2 is rotated with respect to the output shaft 3, as shown in FIG. 19, the center of one end of the first magnetic yoke 7 is moved to the N pole side, the area of the one end facing the N pole of the magnet portion 6 becomes larger than the area facing the S pole of the magnet portion 6. Also, the center of one end of the second magnetic yoke 8 is moved to the S pole side and the area of the one end facing the S pole of the magnet portion 6 becomes larger than the area facing the N pole of the magnet portion 6. Thus, the amount of a magnetic flux detected by the magnetic sensors 25 and 26 are changed. Accordingly, based on the amount of a magnetic flux detected by the magnetic sensors 25 and 26, the steering torque of a steering wheel rotating the input shaft 2 can be detected.

In this way, due to that the first magnetic yoke 7 and the second magnetic yoke 8 are bent in the L shape, the magnetic flux outputted from the magnetism generation portion 4 can be guided to the outer circumference side of the output shaft 3 and a magnetism detecting device provided with the magnetic sensors 25, 26 can be provided on the outer circumference side of the output shaft 3, so that the length of the input shaft 2 and the output shaft 3 in the axial direction can be formed short.

In the above embodiment shown in FIGS. 1 and 2, it is possible that the first magnetism collecting ring 17, the second magnetism collecting ring 18, the first magnetism collecting yoke 19 and the second magnetism collecting yoke 20 are eliminated, a space between the first magnetic ring 14 and the second magnetic ring 15 is made as a magnetic gap, and the magnetic sensors 25, 26 can be provided in the magnetic gap.

However, when it is constructed as in the above-described embodiment shown in FIGS. 1 and 2, the following working effects are exerted. When the first magnetism collecting ring 17 and the second magnetism collecting ring 18 are not provided but a magnetic gap is provided between the first magnetic ring 14 and the second magnetic ring 15 to detect the magnetic flux in the magnetic gap with the magnetic sensors 25, 26, if the first magnetic ring 14 and the second magnetic ring 15 are not assembled each other with high accuracy, an interval of the magnetic gap is changed due to change in the width of the clearance between the first magnetic ring 14 and the second magnetic ring 15 accompanied with rotation of the input shaft 2 and the output shaft 3, and thus detection of the magnetic flux is affected thereby. That is, due to the influence of an error in assembling of the first magnetic ring 14 and the second magnetic ring 15, magnetic detection of the rotation of the output shaft 3 with respect to the input shaft 2 with accuracy becomes difficult.

On the other hand, in the above embodiment shown in FIGS. 1 and 2, outside the first magnetic ring 14 and the second magnetic ring 15, the first magnetism collecting ring 17 and the second magnetism collecting ring 18 are provided in the housing H, the first magnetism collecting yoke 19 and the second magnetism collecting yoke 20 are provided at the first magnetism collecting ring 17 and the second magnetism collecting ring 18 respectively, and two pairs of projections 21 to 24 are provided at the first magnetism collecting yoke 19 and the second magnetism collecting yoke 20 so that spaces between these two pairs of the projections 21 to 24 are made as the magnetic gaps, and the first magnetism collecting ring 17 and the second magnetism collecting ring 18 are mounted to the housing H and fixed. Therefore, the interval of the magnetic gap is not affected by rotation of the input shaft 2 and the output shaft 3, but constant. That is, in the case of the above embodiment shown in FIG. 1, not affected by the rotation of the input shaft 2 and the output shaft 3, detection can be made while reducing an error of the steering force of the steering wheel.

Figure 20:
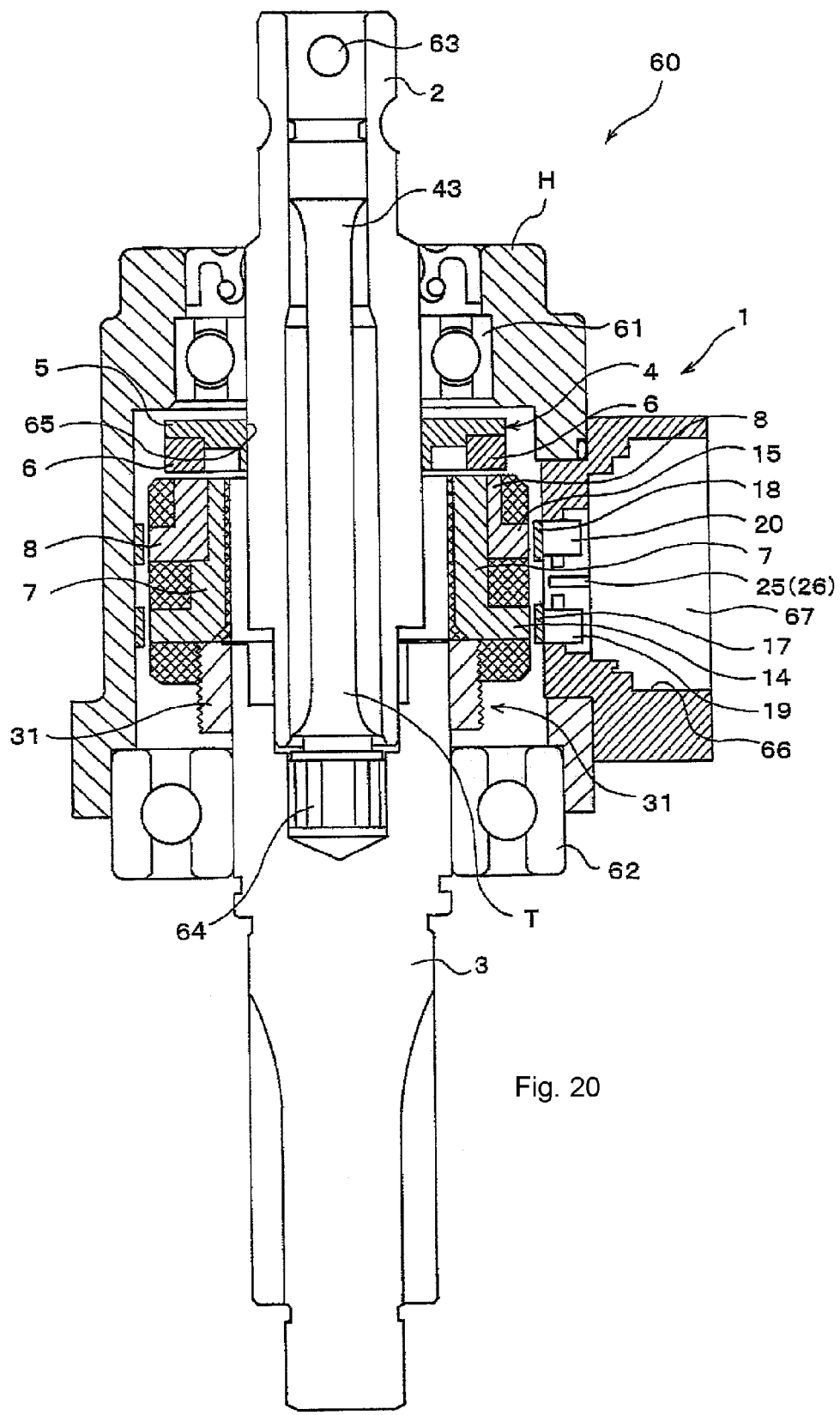
FIG. 20 is a longitudinal sectional view in a state in which the torque sensor according to the embodiment is applied to an electric power steering device.
Figure 21:
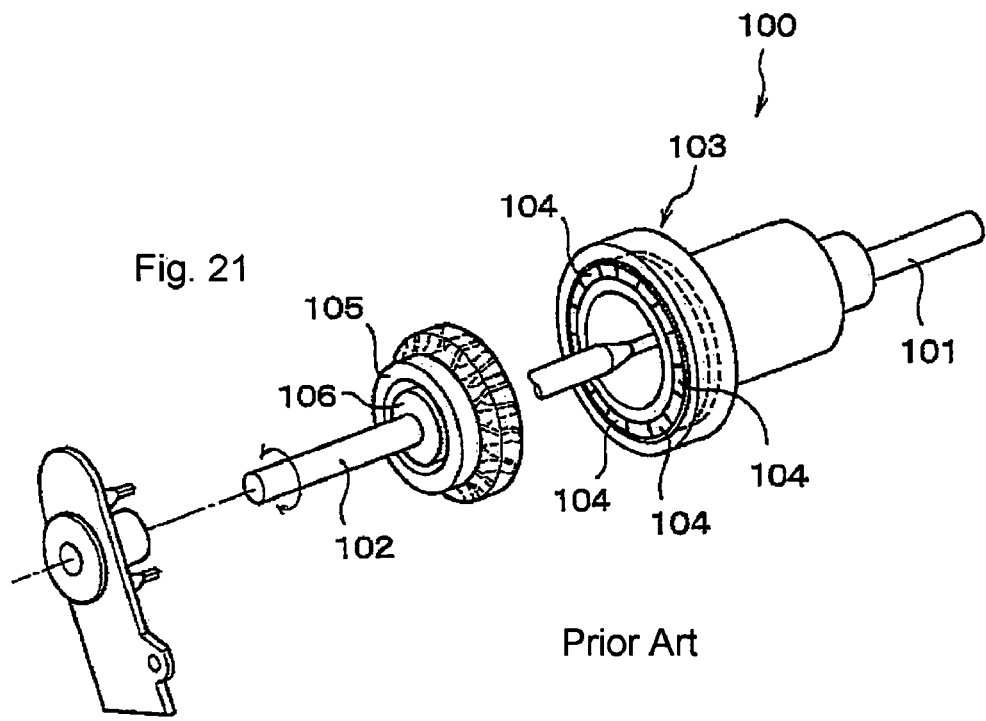
FIG. 21 is a perspective view of a torque sensor.
Figure 22:
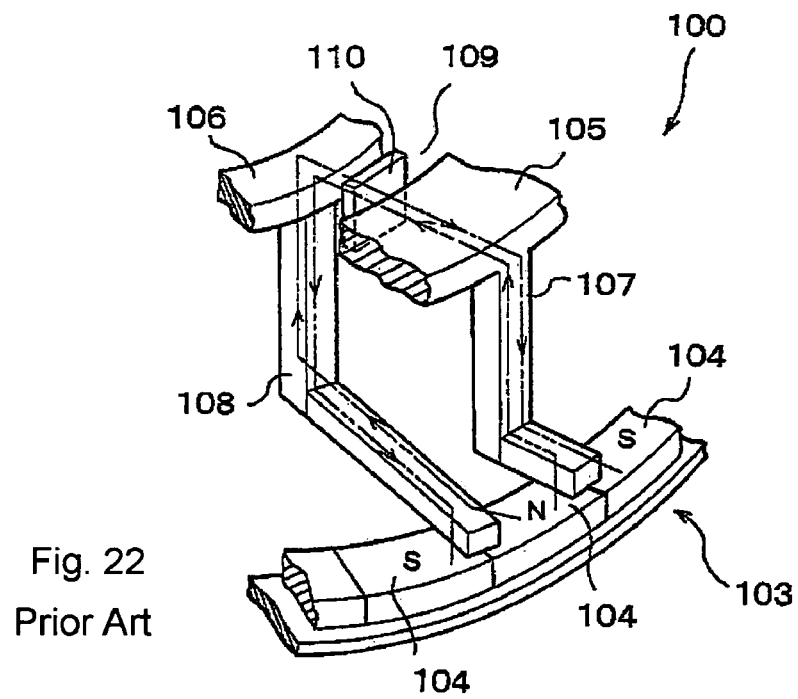
FIG. 22 is a partially enlarged perspective view of the torque sensor.
Figure 23:
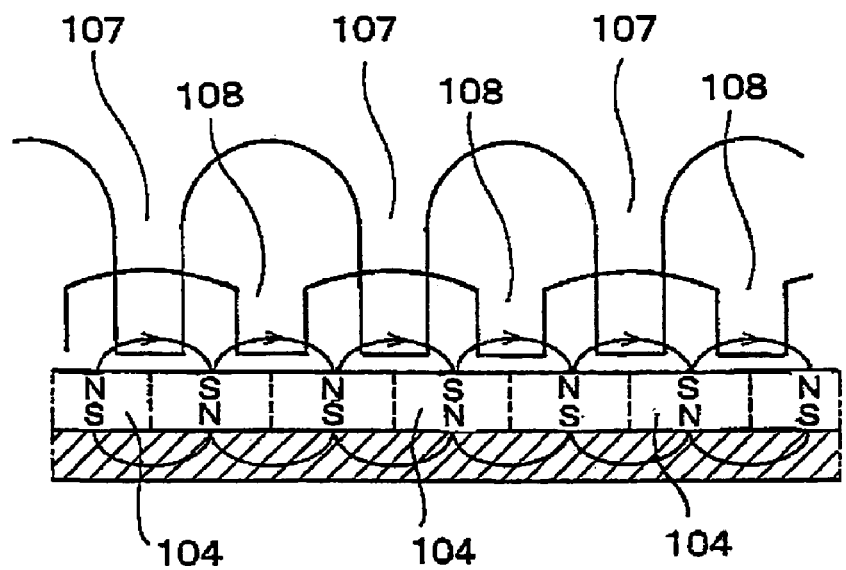
FIG. 23 is a diagram for explaining action.
Figure 24:
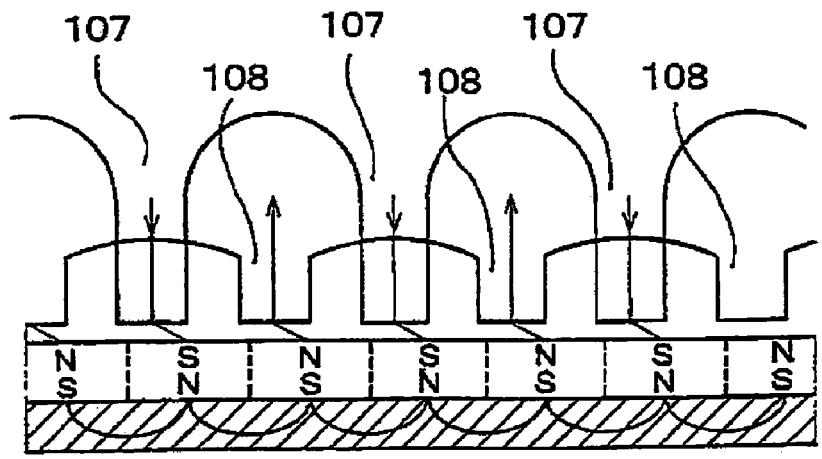
FIG. 24 is a diagram for explaining action.

FIG. 20 shows a longitudinal sectional view of an electric power steering device 60 incorporating the above torque sensor 1. Identical reference numerals are given to the same components as those described in FIGS. 1 to 19 and the descriptions thereof are omitted.

The input shaft 2 and the output shaft 3 are rotatably supported in the housing H by bearings 61, 62. The input shaft 2 is formed in the cylindrical shape, and a torsion bar T is arranged inside. The torsion bar T is connected to the input shaft 2 by a pin 63 at the upper end.

The lower end side of the torsion bar T is connected to the output shaft 3 through a serration 64.

The magnetism generation portion 4 is formed with a shaft insertion hole 65 at the central portion, and is mounted onto the input shaft 2. In the housing H, a magnetism detecting device mounting hole 66 is formed, and a magnetism detecting device 67 is mounted in the magnetism detecting device mounting hole 66. The magnetism detecting device 67 is provided with the magnetic sensors 25, 26 and incorporates a calculation portion and the like for calculating a magnetic flux amount based on the output from the magnetic sensors 25, 26.

In the magnetism detecting device mounting hole 66, the first magnetism collecting yoke 19 is mounted onto the first magnetism collecting ring 17. Also, the second magnetism collecting yoke 20 is mounted onto the second magnetism collecting ring 18. At the first magnetism collecting yoke 19 and the second magnetism collecting yoke 20, the projections 21, 23, 22, 24 (shown in FIG. 1) are provided so as to be opposed to each other. Between the projections 21, 23, 22, 24 opposed to each other, the magnetic sensors 25, 26 are arranged.

In the above description, the case where the torque sensor 1 is applied to the electric power steering device 60 to detect the steering torque of the steering wheel has been described, but not limited to the electric power steering device 60, it can be widely applied for detection of a torque between two shafts.

Furthermore, in the above description, although a pressure receiving portion R1 is formed on the inside of the insertion hole 31a of the magnetic yoke assembly 31, the pressure receiving portion may be provided on the outer circumference side of the magnetic yoke assembly 31.

What is claimed is:

1. A torque sensor comprising:
a first shaft having a first shaft central axis;
a second shaft;
a torsion bar connecting the first shaft and the second shaft together at first and second ends of the torsion bar;
a magnetism generation portion mounted onto the first shaft so as to surround an outer circumference of the first shaft, the magnetism generation portion producing a magnetic flux in a direction of the central axis of the first shaft;
a first magnetic yoke and a second magnetic yoke, each mounted onto the second shaft with a magnetic gap between them; and
a magnetic sensor operable to detect magnetic flux in the magnetic gap between the first magnetic yoke and the second magnetic yoke;
wherein the first magnetic yoke and the second magnetic yoke are positioned to guide the magnetic flux into the magnetic gap;
wherein the first magnetic yoke, the second magnetic yoke, and a sleeve that includes a central sleeve opening from a first end surface of the sleeve to a second end surface of the sleeve are molded together with a resin to form a magnetic yoke assembly with a central insertion hole through the magnetic yoke assembly from a first end of the magnetic yoke assembly to a second end of the magnetic yoke assembly;
wherein the first end surface of the sleeve is exposed at the first end of the magnetic yoke assembly;
wherein the second end surface of the sleeve is partially exposed by at least one notch formed in an inner surface inside the central insertion hole of the magnetic yoke assembly; and
wherein the notch is configured to receive a pressing surface of an assembly jig, and wherein the pressing surface of the assembly jig is configured to bear against a portion of the second end surface of the sleeve that is exposed inside the notch at a time when the magnetic yoke assembly is press-fit onto the second shaft.

2. A torque sensor comprising:
a first shaft having a first shaft central axis;
a second shaft;
a torsion bar connecting the first shaft and the second shaft together at first and second ends of the torsion bar;
a magnetism generation portion mounted onto the first shaft so as to surround an outer circumference of the first shaft, the magnetism generation portion producing a magnetic flux in a direction of the central axis of the first shaft;
a first magnetic yoke and a second magnetic yoke, each mounted onto the second shaft with a magnetic gap between them; and
a magnetic sensor operable to detect magnetic flux in the magnetic gap between the first magnetic yoke and the second magnetic yoke;
wherein the first magnetic yoke and the second magnetic yoke are positioned to guide the magnetic flux into the magnetic gap;

wherein the first magnetic yoke. the second magnetic yoke, and a sleeve that includes a central sleeve opening from a first end surface of the sleeve to a second end surface of the sleeve are molded together with a resin to form a magnetic yoke assembly with a central insertion hole through the magnetic yoke assembly from a first end of the magnetic yoke assembly to a second end of the magnetic yoke assembly;

wherein the first end surface of the sleeve is exposed at the first end of the magnetic yoke assembly;

wherein the second end surface of the sleeve is partially exposed by at least one notch formed in an inner surface inside the central insertion hole of the magnetic yoke assembly; and wherein a portion of the second end surface of the sleeve is not exposed inside the notch, and wherein that portion of the second end surface of the sleeve that is not exposed inside the notch is in contact with a surface of the resin that is generally perpendicular to the central axis of the first shaft.

3. A torque sensor comprising:

a first shaft having a first shaft central axis;

a second shaft;

a torsion bar connecting the first shaft and the second shaft together at first and second ends of the torsion bar;

a magnetism generation portion mounted onto the first shaft so as to surround an outer circumference of the first shaft, the magnetism generation portion producing a magnetic flux in a direction of the central axis of the first shaft;

a first magnetic yoke and a second magnetic yoke, each mounted onto the second shaft with a magnetic gap between them; and a magnetic sensor operable to detect magnetic flux in the magnetic gap between the first magnetic yoke and the second magnetic yoke;

wherein the first magnetic yoke and the second magnetic yoke are positioned to guide the magnetic flux into the magnetic gap;

wherein the first magnetic yoke, the second magnetic yoke, and a sleeve that includes a central sleeve opening from a first end surface of the sleeve to a second end surface of the sleeve are molded together with a resin to form a magnetic yoke assembly with a central insertion hole through the magnetic yoke assembly from a first end of the magnetic yoke assembly to a second end of the magnetic yoke assembly;

wherein the first end surface of the sleeve is exposed at the first end of the magnetic yoke assembly;

wherein the second end surface of the sleeve is partially exposed by at least one notch formed in an inner surface inside the central insertion hole of the magnetic yoke assembly;

wherein the first magnetic yoke and the second magnetic yoke each include elongate end portions that extend in a direction generally parallel to the central axis of the first shaft;

wherein the elongate end portions of the first magnetic yoke extend beyond the elongate end portions of the second magnetic yoke in a direction substantially parallel to the central axis of the first shaft toward the second end of the magnetic yoke assembly;

wherein the elongate end portions of the first magnetic yoke are disposed radially nearer the central axis of the first shaft than are the elongate end portions of the second magnetic yoke; and wherein at least one end of at least one of the elongate end portions of the first magnetic yoke is exposed inside a concave structure formed in the inner surface inside the central insertion hole of the magnetic yoke assembly.

4. The torque sensor of claim 3, wherein a surface at the elongate end of the first magnetic yoke that is exposed inside the concave structure formed in the inner surface inside the central insertion hole of the magnetic yoke assembly is configured to bear against a surface of an assembly jig at a time when the magnetic yoke assembly is press-fit onto the second shaft.

* * * * *